United States Patent Office 2,944,285
Patented July 12, 1960

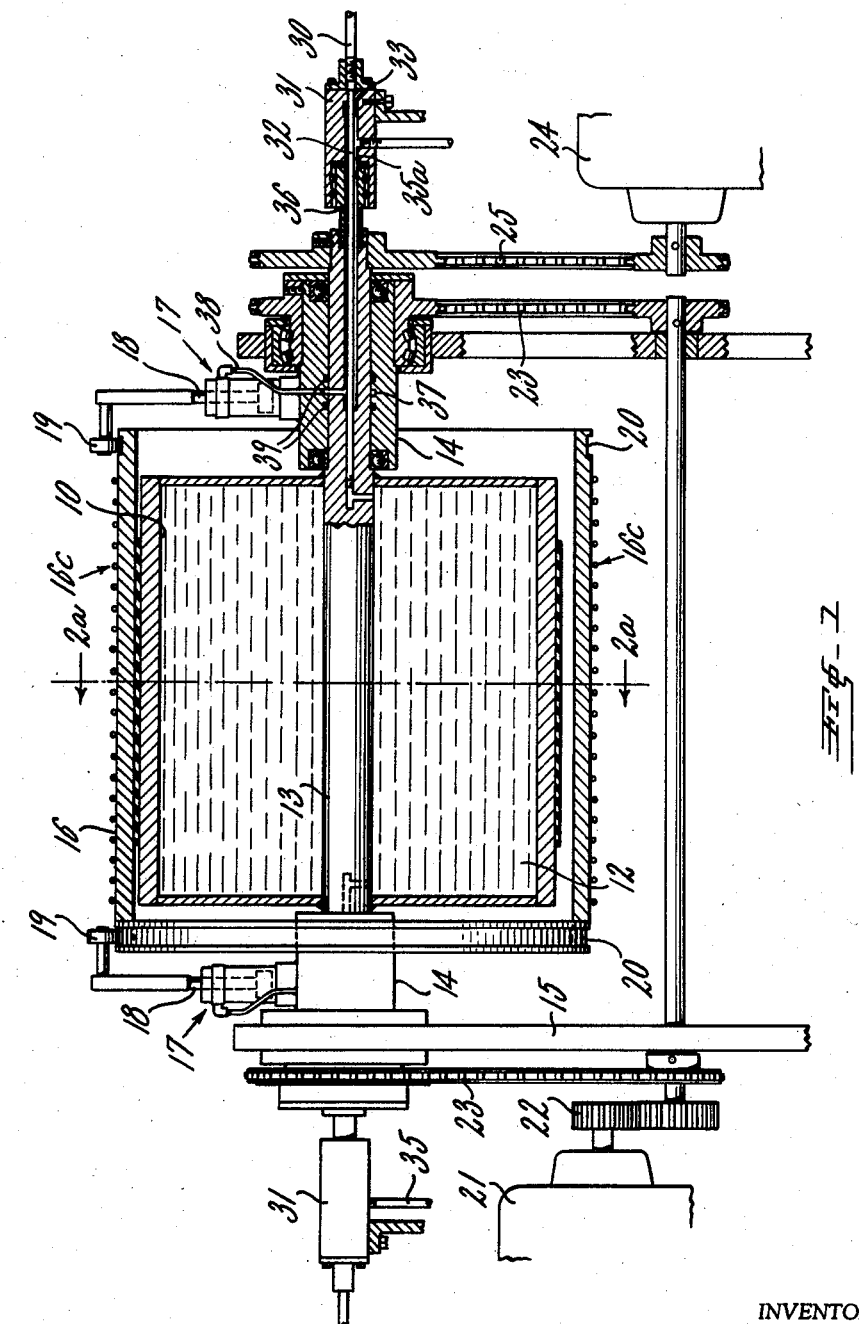

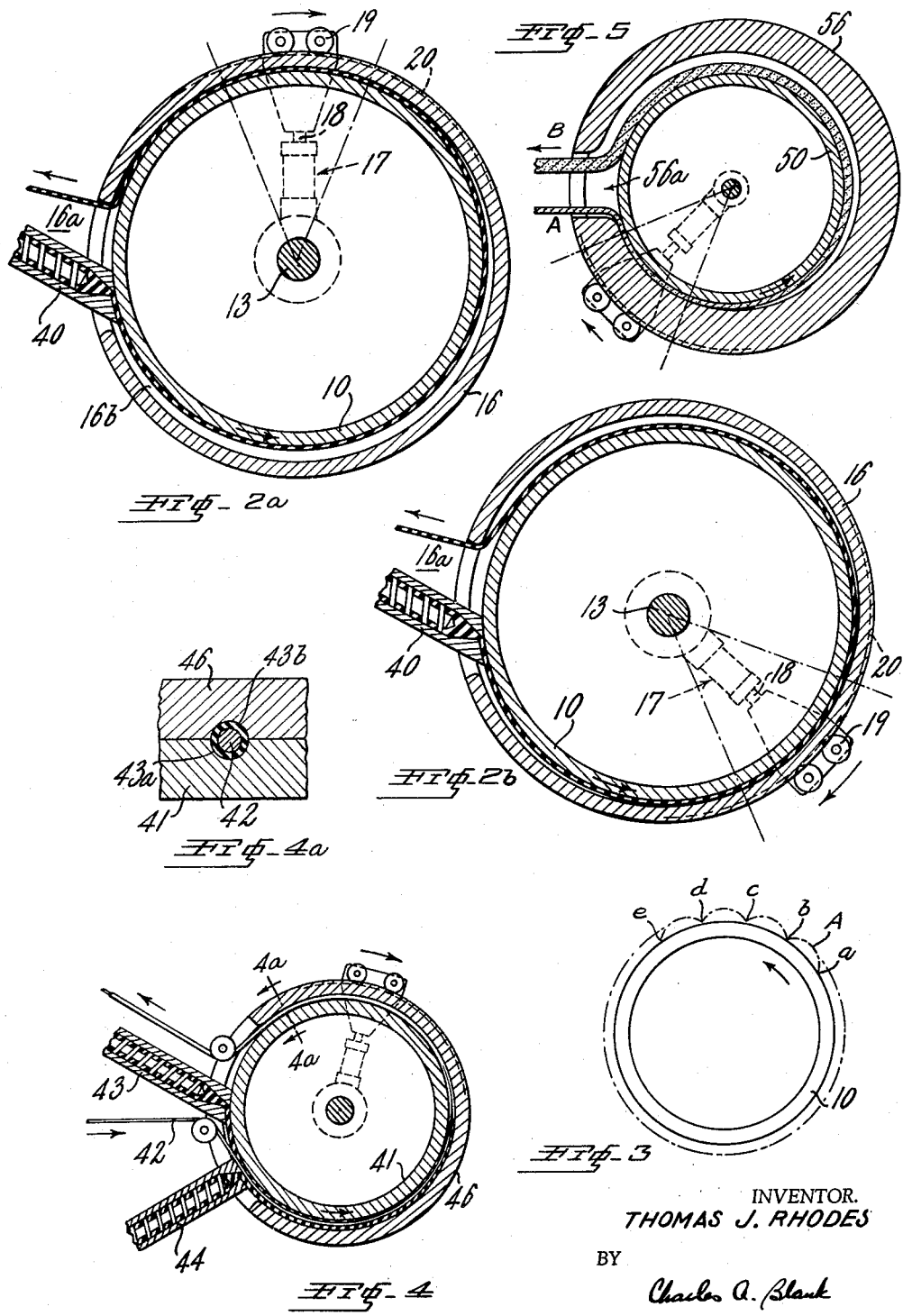

2,944,285
APPARATUS FOR PROCESSING ELASTOMERIC MATERIAL
Thomas J. Rhodes, Smoke Rise, Kinnelon Borough, N.J., assignor to United States Rubber Company, New York, N.Y., a corporation of New Jersey
Filed June 13, 1958, Ser. No. 741,962
11 Claims. (Cl. 18—12)

This invention relates to apparatus for processing elastomeric material. More particularly, the invention relates to apparatus for use in curing elastomers under heat and pressure, in consolidating and vulcanizing layers of elastomeric materials or elastomer-coated fabrics, in molding elastomeric articles, and in embossing sheets of elastomeric materials.

The cure of elastomers generally involves several major problems. Heretofore, a platen press has been commonly employed to cure sheets of rubber. To provide the pressure necessary for the cure over the large surface area of the press, tremendous forces are involved and the size and the cost of the press become prohibitive for many applications. Further, such a press is capable of curing only a predetermined area of a calendered sheet of rubber after which another section of the sheet must be moved into the press. This operation results in a non-uniform cure because the edges of the area cured in one operation of the press are usually subjected to a second treatment in order to make certain that the entire sheet is vulcanized.

Another apparatus known to the art for the curing of rubber sheet continuously conveys a calendered sheet of rubber along the surface of a steel band surrounding a heated drum. This apparatus provides a continuous cure of the rubber sheet but is extremely large in size and also quite expensive due to the special type of conveyor belting required to withstand the very considerable tension imposed upon it in order to develop the necessary pressure for the cure. Also, this belt, usually made of steel, is easily damaged by something like a loose bolt or by fatigue failure and replacement is required periodically. This type of apparatus is also subject to the disadvantage that the rubber sheet is heated only while in intimate contact with the heated drum, it being very difficult to apply heat through the moving band, thus leading to a large utilization of space and energy for non-productive purposes.

Additionally, in order to feed material into the apparatus, a calendered sheet and a carefully selected leader of the proper graduated thickness for the calendered sheet must be employed, in order gradually to adjust the tension of the band or belt prior to the commencement of the curing operation. The prior apparatus also requires the use of side leaders or packing along the calendered sheets, due to the flexibility of the belt and the danger of crimping and thereby damaging the belt if the entire width or thickness thereof is not covered by a sufficient amount of stock.

It is an object of the present invention, therefore, to provide a new and improved apparatus for the processing of elastomeric materials that avoids the disadvantages of prior apparatus.

It is another object of this invention to provide a new and improved apparatus for processing elstomeric material that is both relatively small in size and relatively inexpensive.

It is another object of this invention to provide a new and improved apparatus for the continuous processing of elastomeric material that provides a uniform cure.

It is another object of this invention to provide a new and improved apparatus for processing elastomeric material that is not easily damaged.

It is another object of this invention to provide a new and improved apparatus for processing elastomeric material that does not require the use of leaders.

It is another object of this invention to provide a new and improved apparatus for curing elastomeric materials without the necessity of such materials being carefully calendered in advance to exact specifications.

The apparatus of this invention for processing elastomeric material comprises inner annular means for supporting elastomeric material thereon and outer annular means substantially surrounding the inner annular means. The apparatus also includes means for developing an area of pressure between the inner and outer annular means and for effecting a relative rolling movement between the inner annular means and the outer annular means to cause a continuous rotary displacement of the area of pressure.

For a better understanding of the present invention, together with other and further objects thereof, reference should be made to the following description to be read in connection with the accompanying drawings wherein:

Fig. 1 is an elevational view, partly in section, of the apparatus constructed in accordance with this invention;

Fig. 2a is a sectional view of a portion of the Fig. 1 apparatus taken along line 2a—2a of Fig. 1;

Fig. 2b is a sectional view of the Fig. 1 apparatus along line 2a—2a of Fig. 1 at a different time in the operating cycle from the view of Fig. 2a;

Fig. 3 is a diagram to aid in the explanation of the operation of the apparatus;

Fig. 4 is a sectional view of a portion of the apparatus constructed in accordance with a modified form of the invention;

Fig. 4a is a fragmentary view in section of the Fig. 4 apparatus taken along the line 4a—4a; and Fig. 5 is a sectional view of a portion of the apparatus constructed in accordance with a modified form of the invention.

Referring particularly to Fig. 1, the apparatus comprises first annular means 10 rotatable about its axis. The first annular means 10 is preferably a heated hollow drum containing hot oil 12 for heating its exterior surface. A central shaft 13 along the axis of the drum 10 supports the drum and is rotatably mounted in suitable sleeves 14, attached to frame members 15.

The second annular means above described is represented in the Fig. 1 embodiment as ring 16 of larger diameter than the drum 10. Ring 16 has no means of support other than drum 10 and pressing means to be described. That is, ring 16 loosely surrounds the drum 10. As is apparent in Fig. 2a, the ring 16 has an aperture 16a along a portion of its circumference to allow for both the feeding of elastomer for processing in the space 16b between the drum 10 and the ring 16 and for the removal of the elastomer after processing.

An extruder 40 of conventional construction is represented in section in Fig. 2a as feeding the apparatus, but it should be understood that any suitable feeder may be employed, for example, a calendered sheet may be fed into the apparatus from a roll. Also, sheets of rubberized fabric might be fed into the apparatus for vulcanization. Any other means for continuous feeding of elastomeric stock containing suitable vulcanizing agents may be employed as well.

Means for pressing the ring against the drum over a minor portion of the perimeter of the drum is represented by a pair of hydraulic cylinders 17, rotatably mounted on the central shaft 13 and attached to the sleeves 14. The cylinders 17 have pistons 18 and wheels 19 riding in tracks 20 of the ring 16 for pressing the ring 16 against the drum 10 over a minor portion of the perimeter of the drum as represented in Fig. 2a, for example, over a 45° arc. While tracks 20 are shown diagrammatically as being at the outermost perimeter of ring 16, it is to be understood that the wheels or rollers 19 may be so arranged as to ride in tracks in any position where they can exert an inward radial force to cause ring 16 to press against drum 10 at the points of contact between the ring 16 and rollers 19. It is also possible to use only one track of rollers or more than two tracks of rollers although the use of two tracks is preferable. The preferred number of wheels per track varies with the size of the machine and the pressure to be exerted but is not critical.

This pressing means is rotated to cause a continuous displacement of the area of pressure between ring 16 and drum 10. Specifically, means are provided for rotating the hydraulic cylinders 17 to cause a displacement of the area of pressure between the drum 10 and the ring 16. Rotation is controlled by means comprising a drive motor 21, connected through gears 22 and drive chains 23, to the rotatable sleeves 14, and thereby rotating the sleeves, on suitable bearings, with respect to the central shaft 13.

In the embodiment shown in Fig. 1, the aperture 16a in ring 16 must be kept substantially stationary with respect to angular rotation in order to prevent twisting or breaking of the stock being fed in or withdrawn. This is accomplished by the utilization simultaneously of two physical relationships, which are described below.

First, when a freely rotatable ring surrounding a rotating drum is pressed up against the drum, the ring will tend to rotate in the same direction and at the same speed as the drum.

Secondly, when a rotatable ring surrounds a stationary drum and the ring is pressed against the drum with a rotating pressing means acting so as to cause a continuous displacement of the area of contact between the ring and the drum, the ring tends to move in the direction of rotation of the pressing means. That is, the ring rolls around the drum. For each complete cycle of the pressing means, a point on the circumference of the ring will move, with respect to a stationary point, a circumferential distance of pi times the difference in diameters between the exterior of the drum and the interior of the ring. (When a layer of stock is on the drum, the overall diameter of the drum plus the layer of stock thereon is employed in place of the exterior drum diameter.)

These two above indicated principles are used to maintain the aperture 16a in ring 16 essentially stationary with respect to angular rotation. The drum 10 is caused to rotate in one direction, say counterclockwise, as shown in Fig. 2a, and the cylinder 17 of the pressing means is caused to rotate in an opposite or clockwise direction. Thus, the drum will push the ring in one direction and the pressing means will tend to roll the ring in the opposite direction with the net result, if the speeds are correctly balanced, that the ring will remain substantially constant with respect to angular displacement, having only a small rocking back and forth motion.

In operation, the drum is rotated at a predetermined speed according to the nature of the stock being processed. The speed is chosen to insure adequate contact time for satisfactory curing of the elastomer while within the apparatus but to prevent scorching. The required contact time is generally the same in this apparatus as in any other and, as such, is well known to the art.

The rotation of the pressing means in the opposite direction is employed to counterbalance the effect of the drum with respect to rotation of the ring. By calculation based upon the known speed of rotation of the drum and the known displacement of the ring per cycle of rotation of the pressing means, the speed of rotation of the pressing means is set to balance the two factors. The speed is generally so set as to maintain an interval of at least one second between successive pressing actions on the same increment of stock.

In particular, the rotational speed of the pressing means may be calculated as follows:

Let $V_p$ = rotational speed of pressing means.
$V_d$ = rotational speed of drum.
$d_d$ = diameter of drum with stock thereon.
$\Delta d$ = difference in diameters of ring and drum with stock thereon.
$R$ = revolutions per unit time of pressing means.
$t$ = thickness of ring.
$d_e$ = effective diameter of the path of rotation of the pressing means.

Counterclockwise rotation of the ring in one second due to rotation of the drum and with no rotation of the pressing means may be expressed:

$$V_d \frac{\text{feet}}{\text{sec.}} \times 1 \text{ sec.} = V_d \text{ feet} \quad (1)$$

Clockwise rotation of ring in one second due to rotation of the pressing means and with the drum stationary may be expressed:

$$\pi(\Delta d)\frac{\text{feet}}{\text{revolution}} \times R\frac{\text{revolutions}}{\text{second}} \times 1 \text{ sec.} = \pi R(\Delta d) \text{ feet} \quad (2)$$

The sum of the two effects gives substantially no movement:

$$V_d \text{ feet} + \pi R(\Delta d) \text{ feet} = 0 \quad (3)$$

Transposing and solving for R:

$$R = \frac{V_d}{\pi(\Delta d)} \frac{\text{revolutions}}{\text{second}} \quad (4)$$

But $$R\frac{\text{revolutions}}{\text{second}} \times \pi d_e \frac{\text{feet}}{\text{revolution}} = V_p \frac{\text{feet}}{\text{second}} \quad (5)$$

Hence, substituting Equation 4 in Equation 5

$$V_p = V_d \left(\frac{d_e}{\Delta d}\right) \quad (6)$$

The effective diameter $d_e$ of the path of the pressing means is equal to twice the effective radius which is always constant. The effective radius of the pressing means is equal to $\frac{1}{2}d_d + t$.

Hence $$d_e = d_d + 2t \quad (7)$$

Substituting Equation 7 in Equation 6:

$$V_p = V_d \left(\frac{d_d + 2t}{\Delta d}\right) \quad (8)$$

Restated, the drum rotates and the ring rolls around the drum in the opposite sense to the rotation of the drum and at a speed to prevent substantial angular displacement of the ring. For more precise control of the rate of rotation of the pressing means, e.g., in order to counteract the effect of possible variations in the thickness of the stock entering, automatic control means may be employed to speed up or slow down the rotation of the pressing means based upon variations in the angular displacement of the ring 16. If the ring 16 is tending to displace in a clockwise direction in the example illustrated in Fig. 2a, the automatic control means, upon sensing this displacement, will cause the rate of rotation of the pressing means to slow down thereby imparting less tendency to clockwise rotation to the ring. Conversely, if the ring is tending to displace in a counterclockwise direction, then, the automatic means will speed up the rate of rotation of the pressing means thereby imparting a greater amount of tendency to counterclockwise rotation to the ring.

The means for rotating the drum 10 includes a drive motor 24 connected through a suitable drive chain 25 to the control shaft 13.

The heating oil for the drum is supplied through a line 30 connected to a stationary housing 31 surrounding a tube 32 which is threaded into the central shaft 13 and rotatates therewith. A suitable seal 33 is utilized between the tube 32 and the housing 31. The oil continuously flows from the line 30 into the drum 10 and is removed through a similar structure 31 at the other end of the apparatus. The ring 16 is preferably heated, either by means of electrical windings 16c on its outer surface or by other means.

High pressure oil for operating the cylinders 17 is supplied through lines 35 attached to the housings 31. The high pressure oil flows through a channel 35a around the tube 32 through a rotating joint 36 threaded in the shaft 13 to a channel 37 in the sleeve 14 and through a line 38 to the cylinder. Suitable seals 39 are employed to prevent oil leakage.

Considering now the operation of the apparatus with reference to Figs. 1, 2a, 2b, and 3, hot oil is fed into the drum 10 of Fig. 1 through lines 30 and 32 to heat the drum while ring 16 is heated by means of windings 16c. High pressure oil is fed to the cylinders 17 through lines 35 and 38 to cause the pistons 18 to exert a radial force on the ring 16, pressing the ring against the drum 10 over a small portion of the circumference of the ring, as represented in Fig. 2a. The cylinders and the associated riding wheels 19 are rotated, as indicated by the arrows of Figs. 2a and 2b, at a speed determined by the driving motor 21. As represented in Figs. 2a and 2b, the area of contact between the ring 16 and the drum 10 continuously changes in accordance with the position of the rotating cylinder. The extruder 40 is shown feeding unvulcanized rubber stock into the aperture 16a and this rubber stock revolves with the drum 10.

As the stock proceeds on its path along the continuously revolving drum, each increment of stock is subjected to a series of intermittent pressing actions. Each time the rollers running on the track in the ring 16 pass over the portion of the ring along the same radius as the increment of stock, the ring presses against the stock which is thereby compressed between the ring and the drum. Upon the rollers passing beyond this point, the pressure on the increment of stock is immediately released. Curve A of Fig. 3 diagrammatically represents the spacing of the outer ring 16 from a given point of stock on the drum 10 as the drum 10 rotates. The stock is subjected to successive pressing actions corresponding to points a, b, c, d, e of curve A.

The frequency of pressure waves on an increment of stock is on the order of 1 pressure wave every second or two. The purpose of these successive pressure waves is to enable the stock to be cured through the application of heat without danger of blowing or expanding it at the same time. If the stock were allowed to pass, without any pressure application, over a heated drum, it would, while curing, expand in a generally random pattern. On the other hand, if the drum and ring were arranged so as to exert continuous pressure on the entering stock, the sheet stock, as is well known to the art, would very rapidly clog the opening and stop moving. This latter difficulty has been minimized through the use of the lubricated die methods disclosed in my U.S. Patent No. 2,842,796, entitled "Rubber Shaping and Vulcanizing Apparatus." As is well known to the art, there are many occasions, as for example, in the manufacture of conveyer belting and rubberized fabrics, where such lubrication is undesirable.

The use of the intermittent pressure waves in this apparatus permits the free passage of the stock therethrough and prevents the blowing of the stock during the curing operation. In addition, the fact that the ring is heated permits the application of heat on both top and bottom of the moving sheet insuring a more uniform cure.

If desired, the apparatus of Fig. 1 may be set so as to cause it to seek its own gauge for the rubber being vulcanized. In this mode of operation the gauge will be determined by the material being processed and by the pressure level in the hydraulic cylinders 17. Alternatively, suitable stops (not shown) may be employed in the cylinders 17 to prevent the pistons from moving beyond predetermined points and thereby establish a predetermined gauge for the rubber being processed. The stops may also be employed to prevent the pistons 18 from causing the ring 16 to press heavily against the drum 10 as the rubber is first fed into the apparatus, thereby eliminating the necessity for leaders to prevent any possible abrasive contact between drum and ring during startup operations.

Referring now more particularly to Fig. 4 of the drawings, there is represented apparatus embodying the invention in another modified form. The Fig. 4 apparatus is employed continuously to coat wire with rubber and to vulcanize the rubber. To this end, the drum 41 has a slot 43a along its circumference and the ring 46 has a complementary slot 43b, as represented in Fig. 4a, which is a sectional view of a portion of the Fig. 4 apparatus taken along line 4a—4a of Fig. 4. Wire 42 is fed into the slot, and one extruder 43 is employed to lay rubber in the slot 43a in the drum while another extruder 44 is utilized to lay rubber over the wire for forming in the slot 43b in the ring. The Fig. 4 apparatus operates in a manner generally similar to that of the Fig. 1 apparatus previously described to cure the rubber on the wire.

Referring now more particularly to Fig. 5, a drum 50 and ring 56 are mounted in a manner similar to the drum 10 and ring 16 of the Fig. 1 embodiment. The ring 56 has a cross-section of gradually varying thickness with a circular outer periphery and a non-circular inner periphery. The Fig. 5 embodiment may be used for the simultaneous controlled blowing and curing sponge rubber or other expandable stocks.

Sponge rubber stock including a suitable blowing agent enters the aperture 56a and is fed into the space between the drum and the ring. Suitable internal stops on the cylinders determine the minimum space between the drum and the ring at any given angular position of the cylinders. Due to the eccentricity of the inner periphery of the ring, the minimum space between the drum and the ring continuously increases from point A to point B on the ring, that is, from the input to the output end of the ring. Accordingly, as the stock proceeds around the drum it will have successively greater space for expansion. The result will therefore be a gradual and carefully controlled expansion of the sponge rubber stock during the curing operation.

While applicant does not wish to be limited to any particular dimensions or operating conditions, the following dimensions and operating conditions for apparatus of the Fig. 1 type have been successfully employed to vulcanize rubber:

| | |
|---|---|
| Outside diameter of drum 10 | 36 inches. |
| Inside diameter of ring 16 | 36¾ inches. |
| Length of drum 10 | 4 inches. |
| Length of ring 16 | 4½ inches. |
| Rotational speed of drum 10 | 1–2 r.p.m. avg. |
| Pressure developed between drum 10 and ring 16 | 100 pounds per square inch. |
| Area under pressure | Approx. 4 inches x 20 inches along circumference of drum. |
| Arc over pressure area | 45–60°. |
| Temperature of drum | 300–400° F. |
| Temperature of ring | 450° F. |

From the foregoing description, it will be apparent that apparatus constructed in accordance with the invention for elastomeric material has several advantages. A uniform continuous cure is provided because each portion of the material processed is subjected to substantially the same number of intermittent pressure applications. The apparatus is relatively small in size and inexpensive and yet is capable of developing the high pressures on the order of 500 lbs. per square inch desirable for vulcanization. This is possible because the force exerted between the drum and ring is exerted over a minor portion of the circumference at any given time. Also, the forces are radial forces with the result that the outer frame support is not subjected to these forces and can be relatively small in size. The apparatus is not easily damaged because there are no great tensile forces involved.

The apparatus also does not require the use of leaders and can cure fairly roughly extruded rubber as well as carefully calendered sheets of rubber. The apparatus is versatile and can be used for many purposes including vulcanization, consolidation of layers, embossing and molding. Embossing can be accomplished by utilizing a suitable embossing pattern on the surface of the drum. Molding can be accomplished by utilizing cavity molds suitably spaced on the surface of the drum. Additionally, the drum and ring are intimately in contact with the rubber, thereby minimizing heat loss. In a modified form, the apparatus is capable of processing blown stock having controlled expansion.

While there have been described herein what are at present considered to be the preferred embodiments of this invention, it will be obvious to those skilled in the art that various changes and modifications may be made therein without departing from the true spirit of the invention and it is therefore to be understood that this application is to be considered as being limited only by the scope of the appended claims.

Having thus described my invention, what I claim and desire to protect by Letters Patent is:

1. Apparatus for processing elastomeric material comprising inner annular means for supporting elastomeric material thereon; unsupported outer annular means substantially surrounding said inner annular means and displaced therefrom by the elastomeric material; means for developing an area of pressure between said outer annular means and the material on said inner annular means along a minor portion of the periphery of said outer annular means; and means for causing said area of pressure to revolve continuously around said periphery of said outer annular means between said inner and outer annular means to cause a continuous rotary displacement of said area of pressure.

2. Apparatus for processing elastomeric material comprising an inner drum rotatable about its axis for supporting elastomeric material; an unsupported outer ring of larger diameter than and substantially surrounding said drum and displaced therefrom by the elastomeric material; means for developing an area of pressure between said ring and the material on said drum along a minor portion of the periphery of said ring; and means for causing said area of pressure to revolve continuously around said periphery of said ring.

3. Apparatus as in claim 2 which includes means for heating said drum and said ring.

4. Apparatus for processing elastomeric material comprising inner annular means for supporting elastomeric material thereon; unsupported outer annular means substantially surrounding said inner annular means and displaced therefrom by the elastomeric material and containing an aperture along a portion of the periphery of said outer annular means to allow the feeding and withdrawal of material being processed between said inner and outer annular means; means for developing an area of pressure between said outer annular means and the material on said inner annular means along a minor portion of the periphery of said outer annular means; and means for causing said area of pressure to revolve continuously around said periphery of said outer annular means.

5. Apparatus for processing elastomeric material comprising first annular means rotatable about its axis; second annular means of larger diameter than and substantially surrounding said first annular means, said second annular means containing an aperture along a portion of its periphery to allow the feeding and withdrawal of material being processed between said first and second annular means; rotatable means for pressing said second annular means radially against the material on said first annular means over a minor portion of the perimeter of said first annular means; means for driving said pressing means to cause a continuous rotary radial displacement of the portion of said second annular means being pressed against the material; and means for rotating said first annular means to carry the material through the apparatus.

6. Apparatus for processing elastomeric material comprising first annular means rotatable about its axis for supporting elastomeric material; means for rotating said first annular means to carry the material through the apparatus; second annular means of larger diameter than said first annular means and substantially surrounding said first annular means and having an aperture along a portion of the periphery of said second annular means to allow the conveying of material to be processed between said first and second annular means; rotatable means for pressing said second annular means against the material on said first annular means over a minor portion of the periphery of said first annular means; and means for rotating said pressing means in a direction opposite to the direction of rotation of said first annular means to cause a continuous displacement of the area of pressure between said first and second annular means, the speed of rotation of said pressing means being set so as to prevent substantial angular displacement of said aperture of said second annular means.

7. Apparatus for processing elastomeric material comprising a drum rotatable about its axis for supporting elastomeric material; a central shaft along said axis of said drum for supporting said drum; means for rotating said drum to carry the material through the apparatus; a ring of larger diameter than said drum and substantially surrounding said drum and having an aperture along a portion of the periphery of said ring to allow the feeding of material to be processed between said drum and said ring; pressing means rotatably mounted on said central shaft for pressing said ring against said drum over a minor portion of the periphery of said drum; and means for rotating said pressing means in the opposite sense to the rotation of said drum to cause a continuous displacement of the area of pressure between said drum and said ring, the speed of rotation of said pressing means being set so as to prevent substantial annular displacement of said aperture of said ring.

8. Apparatus as in claim 7 in which said ring has one or more circumferential tracks and said pressing means has one or more rollers riding in said tracks.

9. Apparatus as in claim 8 in which said pressing means comprises one or more hydraulic cylinders rotatably mounted on said central shaft and having one or more pistons to which said rollers are attached.

10. Apparatus for coating wire with elastomeric material and for vulcanizing the material comprising a drum rotatable about its axis and having a circumferential cavity for supporting elastomeric material; means for feeding wire to be coated into the cavity of said drum; means for rotating said drum to carry the wire through the apparatus; a ring of larger diameter than said drum and substantially surrounding said drum and having an aperture along a portion of the periphery of said ring to allow the feeding of wire and elastomeric material to be processed between said drum and said ring; said ring having a circumferential cavity aligned with said cavity of said drum; means for feeding elastomeric material for coating the wire into said cavities of said drum and said ring; means for pressing said ring against said drum over a minor portion of the circumference of said drum; and means for rotating said pressing means in a direction opposite to the direction of rotation of said drum to cause a continuous displacement of the area of pressure between said drum and said ring, the speed of rotation of said pressing means being set to prevent substantial angular displacement of said aperture of said ring.

11. Apparatus for vulcanizing and controlling the blowing of elastomeric material containing a blowing agent comprising a drum for supporting elastomeric material and having a circular periphery and rotatable about its axis an outer ring having a circular outer periphery and having a gradually varying thickness and substantially surrounding said drum and having an aperture along a portion of the periphery of said ring to allow the conveying of material to be processed between said drum and said ring; means for rotating said drum to carry material through the apparatus from the region of greater thickness of said ring to the region of lesser thickness thereof; rotatable means effective to press said ring against the elastomeric material on said drum over a minor portion of the periphery of said drum and effective to maintain said outer periphery of said ring at a predetermined spacing from said drum in the region of the area of pressure between said drum and said ring; and means for rotating said pressing means in a direction opposite to the direction of rotation of said drum to cause a continuous displacement of the area of pressure between said drum and said ring, the speed of rotation of said pressing means being set so as to prevent substantial angular displacement of said aperture of said ring.

References Cited in the file of this patent

UNITED STATES PATENTS 2,842,796     Rhodes _____ July 15, 1958